United States Patent
Paredes Riano et al.

(10) Patent No.: US 10,122,566 B2
(45) Date of Patent: Nov. 6, 2018

(54) DELAY SPAN CLASSIFICATION FOR OFDM SYSTEMS USING SELECTIVE FILTERING IN THE FREQUENCY DOMAIN

(71) Applicant: Intel IP Corporation, Santa Clara, CA (US)

(72) Inventors: Javier Mauricio Paredes Riano, Dresden (DE); Andreas Bury, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 26 days.

(21) Appl. No.: 15/357,478

(22) Filed: Nov. 21, 2016

(65) Prior Publication Data

US 2017/0187564 A1 Jun. 29, 2017

(30) Foreign Application Priority Data

Dec. 24, 2015 (DE) .................. 10 2015 122 839

(51) Int. Cl.
*H04L 27/26* (2006.01)
*H04L 5/00* (2006.01)
*H04L 25/02* (2006.01)

(52) U.S. Cl.
CPC ........ *H04L 27/2695* (2013.01); *H04L 5/0048* (2013.01); *H04L 25/0216* (2013.01); *H04L 25/0224* (2013.01); *H04L 27/2607* (2013.01); *H04L 27/2663* (2013.01); *H04L 27/2672* (2013.01); *H04L 27/2675* (2013.01)

(58) Field of Classification Search
CPC ............ H04L 27/2695; H04L 27/2672; H04L 27/2607; H04L 5/0048
USPC ......................................................... 375/343
See application file for complete search history.

(56) References Cited

U.S. PATENT DOCUMENTS 7,145,971 B2 * 12/2006 Raleigh ............... H04B 7/0615
375/347
2007/0117527 A1 * 5/2007 Xu ....................... H04B 7/0857
455/127.4
2013/0022090 A1 * 1/2013 Weng ............... H04L 25/03343
375/219

* cited by examiner

*Primary Examiner* — Kevin M Burd
(74) *Attorney, Agent, or Firm* — Schiff Hardin LLP (57) ABSTRACT

It is proposed a method for delay spread classification of an orthogonal frequency-division multiplexing signal (multiplexing signal), and a receiving device and a telecommunication device connected thereto, the multiplexing signal comprising at least a first multiplexing symbol comprising at least two first reference symbols in the frequency domain, the method comprising: receiving at least the first multiplexing symbol; demodulating at least the first reference symbols of the first multiplexing symbol; determining at least a first autocorrelation value by autocorrelating the demodulated first reference symbols in the frequency domain; computing the filtered output energy of the autocorrelation and classifying the delay spread by mapping the ratio of the output energy for the filters.

25 Claims, 5 Drawing Sheets

DELAY SPAN CLASSIFICATION FOR OFDM SYSTEMS USING SELECTIVE FILTERING IN THE FREQUENCY DOMAIN

TECHNICAL FIELD

Various aspects of this disclosure generally relate to methods for delay spread classification of an orthogonal frequency-division multiplexing signal and receiving devices and telecommunication devices connected to these methods.

BACKGROUND

OFDM systems (orthogonal frequency-division multiplexing systems), as common in telecommunication, television or other wireless data transmission systems, can operate in a wide range of conditions and it is desired to optimize the performance of the system by adaptation of the channel estimation algorithm to delay, Doppler and signal-to-noise ratio (SNR) conditions. Previous methods for estimating the delay spread work in the time domain and involve a high complexity in computing the filter coefficients for channel estimation. This complexity also leads to a high energy consumption.

DESCRIPTION

Figure 1:
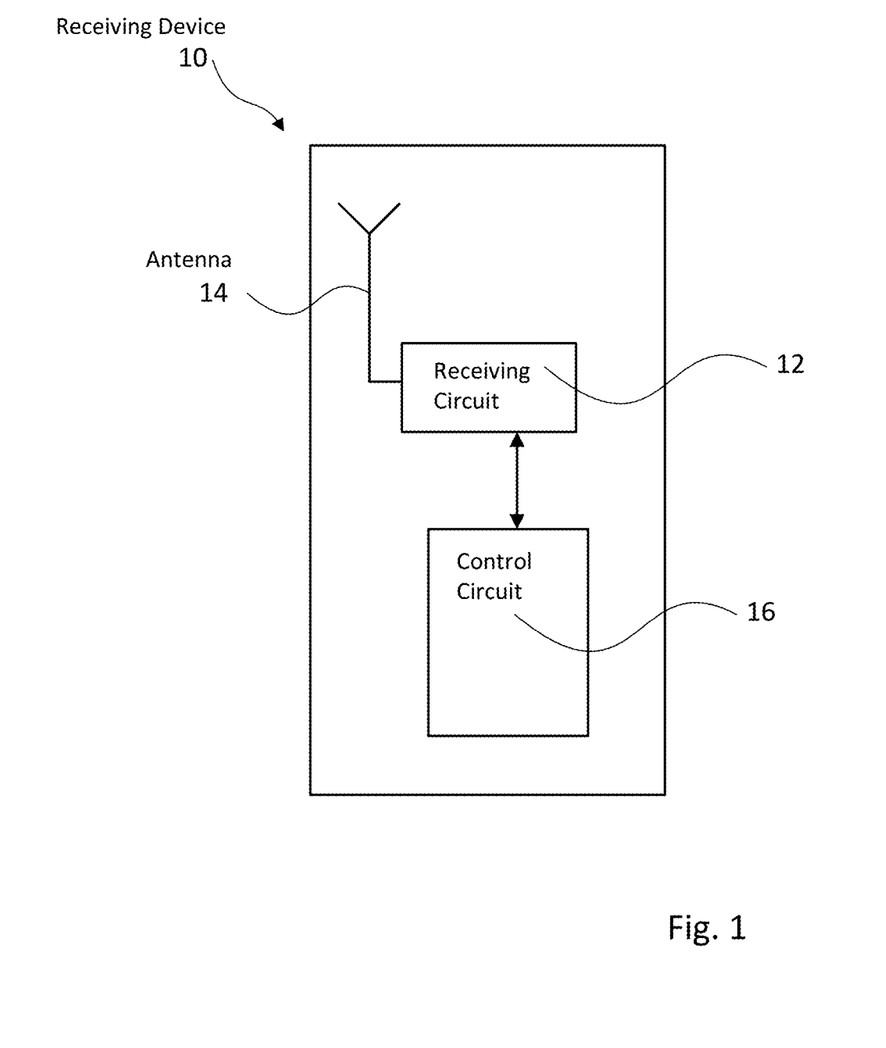
FIG. 1 shows a schematic view of a receiving device

FIG. 1 shows a receiving device 10. The receiving device 10 may be a telecommunication device (e.g. a user equipment, a smartphone, an internet router or similar). The receiving device 10 may be a mobile device. The receiving device 10 may be a television or radio device.

The receiving device 10 may include a receiving circuit 12. The receiving device may include an antenna 14. The receiving circuit may be connected to the antenna 14. The receiving circuit may be configured to receive signals via the antenna 14. The antenna 14 may be a single antenna, a dual antenna, an antenna array or similar. The receiving circuit 12 may include at least one amplifier circuit for amplifying received signals. The receiving circuit 12 may include at least one filter circuit. The receiving circuit 12 may be configured to receive at least one multiplexing signal 20 (multiplexing signal). The multiplexing signal may be a frequency-division multiplexing signal (FDM signal). The multiplexing signal may be an orthogonal frequency-division multiplexing signal (FDM signal). The multiplexing signal may be a signal using a multitude of frequencies of a frequency band for a transmission. The multiplexing signal may be divided in resource elements in the frequency domain and in the time domain.

Figure 2:
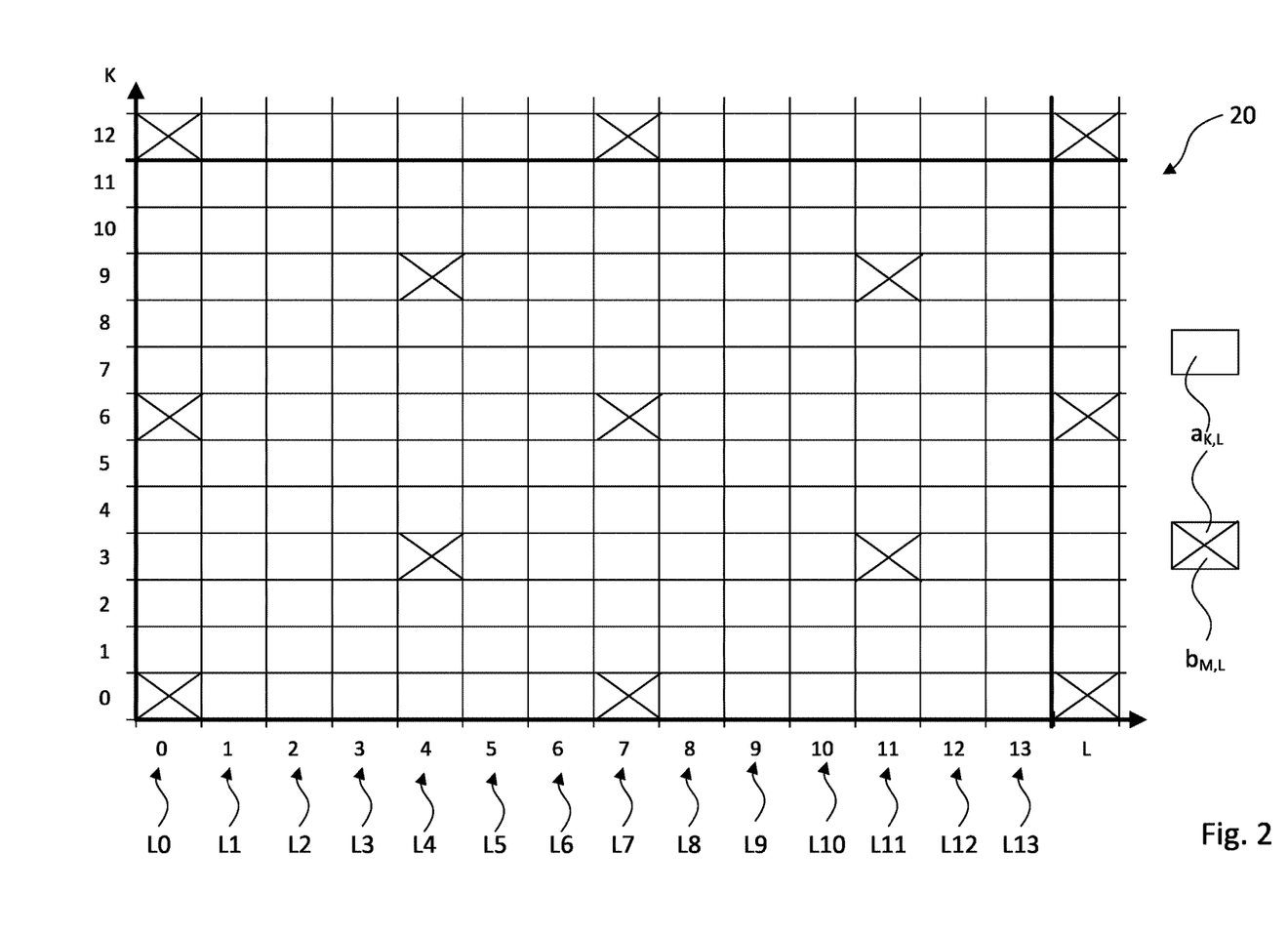
FIG. 2 shows an extract of an exemplary multiplexing signal

FIG. 2 shows a portion of the multiplexing signal 20 in the frequency domain over time. FIG. 2 shows only an excerpt of the multiplexing signal 20 regarding time (ordinate), which may be continued at least to the right but which also may include past components to the left. FIG. 2 shows only an excerpt of the multiplexing signal 20 regarding the frequencies/subcarrieres (coordinate), which may be continued in the top direction, but not to the bottom. FIG. 2 shows a single resource block of the multiplexing signal (including of 14 multiplexing symbols by 12 resource elements). The multiplexing signal 20 may be a pilot based multiplexing signal. The multiplexing signal 20 may be a long term evolution signal (LTE signal). The multiplexing signal may be a digital video broadcast signal (DVB signal). The multiplexing signal 20 may include a first multiplexing symbol L0. The multiplexing signal 20 may include additional ("additional" may generally also be understood as "further" in this application) multiplexing symbols L1-L13. The multiplexing signal 20 may include a multitude of multiplexing symbols L0-L13 in the time domain L. The multiplexing symbols L0-L13 may each occupy an own time slot. The first and additional multiplexing symbols L0-L13 may each include a number $N_a$ of, e.g. at least 72, e.g. at least 180, e.g. at least 300, e.g. at least 600, e.g. at least 900, e.g. at least 1200, resource elements $a_{K,L}$. Each resource element $a_{K,L}$ may be transmitted via a different subcarrier K of the multiplexing signal 20. $a_{K,L}$ hereby is a resource element of the multiplexing symbol L (L may be a number from 0 to 13 to denominate the position of the multiplexing symbol within a subframe) and the subcarrier K (K may be a number from 0 to $N_a-1$). The resource elements $a_{K,L}$ may each represent (or be) a complex value. The subcarriers K may be sorted by their frequency. A selection (a number $N_b$) of these resource elements $a_{K,L}$ may include or be reference symbols $b_{M,L}$ (M may be a number from 0 to $N_b-1$). The reference symbols $b_{M,L}$ may have been sent out from the signal source as representing a same complex value, but may differ after reception in the receiving circuit 12 due to various factors such as delay spread, Doppler spread, Time or frequency shifts, path loss, correlation between antennas or other. The first multiplexing symbol L0 may include at least two, e.g. at least 12, e.g. at least 30, e.g. at least 50, e.g. at least 100, e.g. at least 150, e.g. at least 200, first reference symbols $b_{M,0}$ in the frequency domain K. The additional multiplexing symbols L4, L7, L11 may include at least two, e.g. at least 12, e.g. at least 30, e.g. at least 50, e.g. at least 100, e.g. at least 150, e.g. at least 200, additional reference symbols $b_{M,L}$ in the frequency domain K. The first reference symbols $b_{M,0}$ of the first multiplexing symbol L0 occupy different resource elements $a_{K,L}$ (is transmitted via different subcarriers) than the additional reference symbols $b_{M,4}$ of a first additional multiplexing symbol L4. The first reference symbols $b_{M,0}$ of the first multiplexing symbol L0 occupy the same resource elements $a_{K,L}$ (is transmitted via the same subcarriers) as the additional reference symbols $b_{M,7}$ of a second additional multiplexing symbol L7. The additional reference symbols $b_{M,4}$ of the first additional multiplexing symbol L4 occupy the same resource elements $a_{K,L}$ (is transmitted via the same subcarriers) as the additional reference symbols $b_{M,11}$ of a third additional multiplexing symbol L11. The first multiplexing symbol L0 is separated from the first additional multiplexing symbol L4 by three multiplexing symbols L1, L2, L3 without reference symbols. The first additional multiplexing symbol L4 is separated from the second additional multiplexing symbol L7 by two multiplexing symbols L5, L6 without reference symbols. The third additional multiplexing symbol L11 is separated from the second additional multiplexing symbol L7 by three multiplexing symbols L8, L9, L10 without reference symbols. The first multiplexing symbol may mark a beginning of a subframe according to LTE definition. The first multiplexing symbol may have any position within the subframe according to LTE definition. The 14 multiplexing symbols L0-L13 together form a subframe according to LTE definition. The first reference symbols $b_{M,0}$ of the first multiplexing symbol L0 may occupy every 6th subcarrier K of the multiplexing signal 20. One of the reference symbols $b_{0,0}$ may occupy the first (lowest) subcarrier (K=0) of the multiplexing signal 20. The additional reference symbols $b_{M,4}$ of the first additional multiplexing symbol L4 may occupy every 6th subcarrier of the multiplexing signal 20. One of the reference symbols $b_{3,4}$ may occupy the fourth subcarrier (K=3) of the multiplexing signal 20. A sampling rate/density of the reference symbols in the first and additional multiplexing symbol may be the same. Sampling as many (every sixth) subcarriers may allow for alias free operation for long impulse response lengths (e.g. up to 9/128 of a length of an multiplexing signal). To allow alias free operation for longer impulse response length (e.g. in the length of an extended cyclic prefix or similar) it may be suitable to sample more than every sixth subcarrier (resource elements of a multiplexing symbol). The following relation can be denoted between the resource elements $a_{K,L}$ and the reference symbols $b_{M,L}$:

$$b_{M,L}=a_{6M,L} \text{ for } L=0 \text{ or } 7 \text{ and } b_{M,L}=a_{6M+3,L} \text{ for } L=4 \text{ or } 11 \quad (1)$$

According to alternative embodiments, different arrangements of the reference symbols can be chosen. More or less of the multiplexing symbols than previously described may include reference symbols. Different multiplexing symbols (of the subframe) may be selected (chosen) to include the reference symbols. The multiplexing symbols including reference symbols may include more or less reference symbols than previously described. Different resource elements of the multiplexing symbol may be selected to include the reference symbols. Positions of reference symbols may be determined/fixed by a protocol of the multiplexing system.

The receiving device 10 may include a control circuit 16. The control circuit 16 may be configured to receive at least the first multiplexing symbol L0 from the receiving circuit 12. The control circuit 16 may be configured to receive the multiplexing signal 20 from the receiving circuit 12.

Figure 5:
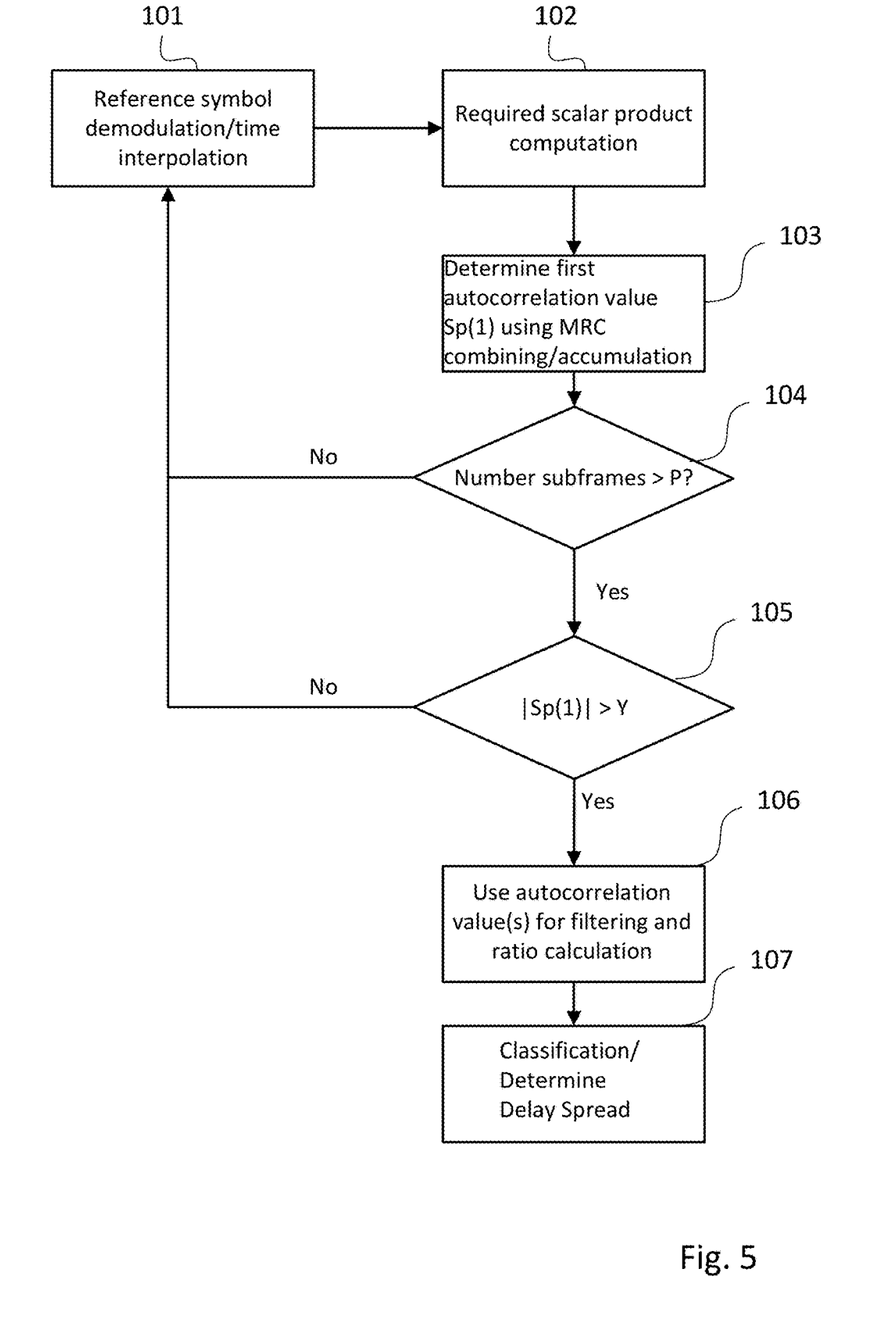
FIG. 5 shows a flow diagram of a method for delay spread classification of an orthogonal frequency-division multiplexing signal

The control circuit 16 may be configured to demodulate at least the first reference symbols $b_{M,0}$ of the first multiplexing symbol L0 (step 101 of flow chart in FIG. 5). The control circuit 16 may include at least one fast furrier transformation circuit for determining the resource elements from the multiplexing symbol(s) L0-L13/multiplexing signal 20.

The demodulated reference symbols $B_{M,L}$ herein may be derived by multiplying the received reference symbol $b_{M,L}$ with the conjugate of the original reference symbol $r_{M,L}$ that was expected to be received according to a protocol of the multiplexing signal. The demodulated reference symbols may be interpreted as the channel gain seen by the receiver (plus noise and interference).

$$B_{M,L}=b_{M,L} \cdot r_{M,L}^* \quad (2)$$

Herein ( )* denominates the conjugate operator.

The control circuit 16 may be configured to determine at least a first autocorrelation value Sp(n) by autocorrelating the demodulated first reference symbols $B_{M,0}$ in the frequency domain (by correlating demodulated reference symbols $B_{M,0}$ of the same multiplexing symbol with each other).

The control circuit 16 may be configured to form a first vector from the demodulated first reference symbols $b_{M,0}$ of the first multiplexing symbol L0. The control circuit 16 may be configured to determine at least one first scalar product $Sp_L(n)$ from the first vector with a shifted version of the first vector (step 102 of flow chart in FIG. 5). The shifted vector herein is a version of the first vector being shifted by a first degree n. n hereby denominates a degree of shifting of the first vector. The control circuit 16 may be configured to determine the first autocorrelation value Sp(n) from the first scalar product $Sp_0(n)$. The first autocorrelation value Sp(n) may be the first scalar product $Sp_0(n)$ or may be a function of the first scalar product $Sp_0(n)$. The scalar product hereby may be defined as:

$$Sp_L(n) = \sum_{M=0}^{N_b-n-1} B_{M,L} B_{M+n,L}^* \text{ for } n \geq 0 \text{ and} \quad (3)$$

$$Sp_L(n) = Sp_L(-n)^* \text{ for } n < 0$$

The control circuit 16 may be configured to demodulate at least one, e.g. every, of the additional reference symbols $b_{M,4}$, $b_{M,7}$, $b_{M,11}$ of the additional multiplexing symbols L4, L7, L11. The control circuit 16 may be configured to determine at least the first autocorrelation value Sp(n) by autocorrelating the demodulated first and additional reference symbols $B_{M,0}$, $B_{M,4}$, $B_{M,7}$, $B_{M,11}$ in the frequency domain. The control circuit 16 may be configured to determine at least the first autocorrelation value Sp(n) by forming additional vectors from the demodulated additional reference symbols $B_{M,4}$, $B_{M,7}$, $B_{M,11}$ of the additional multiplexing symbols L4, L7, L11. The control circuit 16 may be configured to determining at least one, e.g. at least three, e.g. as many as necessary, additional scalar product $Sp_4(n)$, $Sp_7(n)$, $Sp_{11}(n)$ from the additional vector with a version of the additional vector shifted by the first degree n (see (2)). The control unit may be configured to determine the first autocorrelation value Sp(n) from the first and additional scalar product $Sp_0(n)$, $Sp_4(n)$, $Sp_7(n)$, $Sp_{11}(n)$. The control circuit 16 may apply a maximum ratio combining method for determining the first autocorrelation value Sp(n) from the first and additional scalar product $Sp_0(n)$, $Sp_4(n)$, $Sp_7(n)$, $Sp_{11}(n)$.

The control circuit 16 may be configured to determine a first signal to noise ratio of the first scalar product $Sp_0(n)$. The control circuit 16 may be configured to determine an additional signal to noise ratio of the additional scalar product $Sp_4(n)$, $Sp_7(n)$, $Sp_{11}(n)$. The control circuit 16 may be configured to determine at least the first autocorrelation value Sp(n) by weighting the first and additional scalar product $Sp_0(n)$, $Sp_4(n)$, $Sp_7(n)$, $Sp_{11}(n)$ by their respective signal to noise ratio. The control circuit 16 may be configured to determine at least the first autocorrelation value Sp(n) by weighting the first and additional scalar product $Sp_0(n)$, $Sp_4(n)$, $Sp_7(n)$, $Sp_{11}(n)$ by weighting factors (MRC-factors) $u_L$ (step 103 of flow chart in FIG. 5). The weighting factors may be proportional to the respective signal to noise ratio. At least the first autocorrelation value Sp(n) may be defined as follows:

$$Sp(n) = \sum_L u_L Sp_L(n) \quad (4)$$

A sum of the weighting factors $u_L$ may be one. A sum of the weighting factors $u_L$ may be bigger than one. The weighting factors $u_L$ may be (proportional to) the signal to noise ratios of the respective scalar product Spy.

The control circuit 16 may be configured to determine at least one additional autocorrelation value Sp(i) by determining at least an additional scalar product $Sp_L(i)$ of the first vector with a shifted versions of the first vector, the degree i of shifting being different from the shifting for the first autocorrelation value.

The control circuit 16 may be configured to determine the first autocorrelation value Sp(1) by determining scalar products $Sp_L(1)$ of at least the first vector with a shifted version of the first vector shifted by 1 (n=1 in (2) and (3)). The control circuit 16 may be configured to determine a first additional autocorrelation value Sp(3) by determining scalar products $Sp_L(3)$ of at least the first vector with a shifted version of the first vector shifted by 3 (n=3 in (2) and (3)). The control circuit 16 may be configured to determine a second additional autocorrelation value Sp(5) by determining scalar products $Sp_L(5)$ of at least the first vector with a shifted version of the first vector shifted by 5 (n=5 in (2) and (3)). The control circuit 16 may be configured to determine a third additional autocorrelation value Sp(7) by determining scalar products $Sp_L(7)$ of at least the first vector with a shifted version of the first vector shifted by 7 (n=7 in (2) and (3)).

Figure 3:
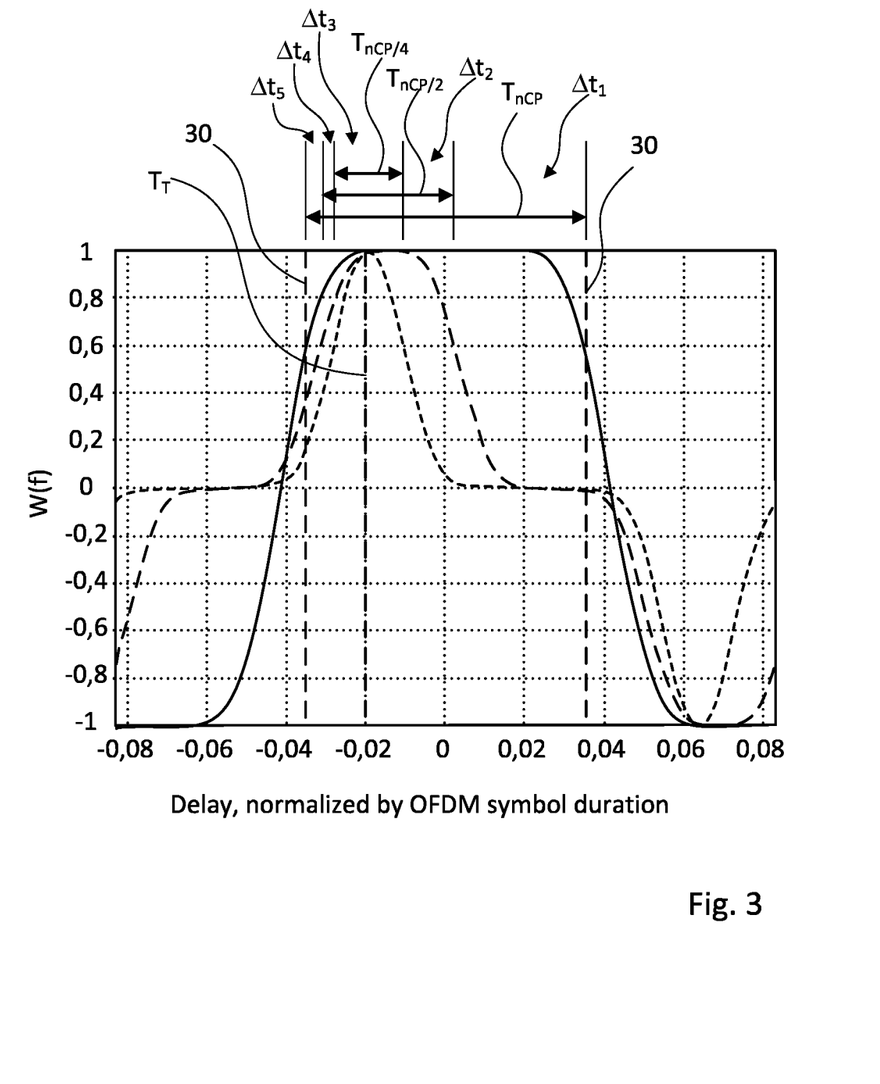
FIG. 3 shows transfer functions of exemplary filters

The control circuit 16 may be configured to provide at least a first filter with a first transfer function $w_{nCP}$ (see FIG. 3). The first transfer function $w_{nCP}$ may have a first transfer width $T_{nCP}$. The first transfer function $w_{nCP}$ may essentially cover a first portion of time $\Delta t_1$, a second portion of time $\Delta t_2$ and a third portion of time $\Delta t_3$. The first portion of time $\Delta t_1$ may (immediately) follow the second portion of time $\Delta t_2$. The second portion of time $\Delta t_2$ may (immediately) follow the third portion of time $\Delta t_3$. A portion of time may be seen as "covered" by the transfer function, when the transfer function has a value of more than 0,2, e.g. more than 0,4, e.g. more than 0,5, e.g. more than 0,6, (of a maximum of the transfer function) for the whole portion of time. The transfer function may have a value of more than 0,7, e.g. more than 0,8, e.g. more than 0,9, (of a maximum of the transfer function) for at least 70%, e.g. at least 80%, e.g. at least 90%, of the covered portion of time. The first transfer width $T_{nCP}$ is shorter than 10% of a length of the first multiplexing symbol. The first transfer width $T_{nCP}$ has a length of a pilot signal of the multiplexing symbol. The first transfer width $T_{nCP}$ is equal to a normal cyclic prefix length of the multiplexing signal. The first transfer width $T_{nCP}$ is 9/128 of a length of the first multiplexing symbol.

The control circuit 16 may be configured to provide at least a second filter with a second transfer function $w_{nCP/2}$. The second transfer function $w_{nCP/2}$ may have a second transfer width $T_{nCP/2}$ shorter than the first transfer width $T_{nCP}$ and essentially covering the second portion of time $\Delta t_2$ and the third portion of time $\Delta t_2$, while essentially excluding the first portion of time $\Delta t_1$. A portion of time may be seen as "excluded" by the transfer function, when the transfer function has a value of less than 0,6, e.g. less than 0,5, e.g. less than 0,4, e.g. less than 0,3, for (essentially) the whole portion of time. The second transfer width $T_{nCP/2}$ is 50% of the first transfer width $T_{nCP}$.

The control circuit 16 may be configured to provide at least a third filter with a third transfer function $w_{nCP/4}$. The third transfer function $w_{nCP/4}$ may have a third transfer width $T_{nCP/4}$ shorter than the second transfer width $T_{nCP/2}$ and essentially covering the third portion of time $\Delta t_3$, while essentially excluding the first and second portions of time $\Delta t_1$, $\Delta t_2$. The third transfer width $T_{nCP/4}$ is 50% of the second transfer width $T_{nCP/2}$. The third portion of time $\Delta t_3$ may include a time-track target $T_T$ (expected signal arrival point; point of center of gravity/focal point core area/focus/centroid of the signal/symbol/channel profile).

The second transfer function $w_{nCP/2}$ may cover a fourth portion of time $\Delta t_4$, which is excluded by the third transfer function $w_{nCP/4}$. The fourth portion of time $\Delta t_4$ may have a length of maximum 20%, e.g. maximum 10%, e.g. maximum 5%, of a length of the second portion of time $\Delta t_2$. The third portion of time $\Delta t_3$ may (immediately) follow the fourth portion of time $\Delta t_4$. The first transfer function $w_{nCP}$ may cover a fifth portion of time $\Delta t_5$, which is excluded by the second (and third) transfer function $w_{nCP/2}$, $w_{nCP/4}$. The fifth portion of time $\Delta t_5$ may have a length of maximum 20%, e.g. maximum 10%, e.g. maximum 5%, of a length of the first portion of time $\Delta t_1$. The fourth portion of time $\Delta t_4$ may (immediately) follow the fifth portion of time $\Delta t_5$. The third portion of time $\Delta t_3$ may (immediately) follow the fifth portion of time $\Delta t_5$. The second transfer function $w_{nCP/2}$ may cover an area completely covered by the first transfer function $w_{nCP}$. The third transfer function $w_{nCP/4}$ may cover an area completely covered by the second transfer function $w_{nCP/2}$.

The portions of time $\Delta t_1$, $\Delta t_2$, $\Delta t_3$, $\Delta t_4$, $\Delta t_5$ may be part of a filter area. The filter area may consist of the portions of time $\Delta t_1$, $\Delta t_2$, $\Delta t_3$, $\Delta t_4$, $\Delta t_5$. The filter area may be defined by cyclic prefix boundaries 30 of the multiplexing signal 20. The filter area may be as wide as the first transfer width $T_{nCP}$.

Alternatively the fourth portion of time may be covered by the second (and third) transfer function, while being excluded by the first transfer function. The fifth portion of time may be covered by the third transfer function, while being excluded by the second (and first) transfer function.

The transfer width of a transfer function may be a sum of the portions of time covered by that transfer function.

The filter(s) (e.g. first, second, third filter) may have a zero coefficient for the central tap. This may improve noise rejection. The filter(s) may have a shape with a response in the pass band region as flat as possible (may vary within less than a 30%, e.g. less than a 20%, e.g. less than a 10%, e.g. less than a 5%, margin). This may improve the classification since comparability of the output energy of the filter(s) is improved. The filter(s) may provide a monotonous decreasing behavior. This may improve the weighting (e.g. may avoid over/under weighting) of the channel taps. The filter(s) may be precomputed and saved in the control circuit. The filter(s) may have a number of (independent) parameters to allow for adaption to different situations. The (independent) parameters may be filter coefficients. The number of parameters may be higher than one, e.g. higher than two, e.g. higher than three, to allow for a high accuracy and/or sharpness of the filter. The number of (independent) parameters may be lower than ten, e.g. lower than eight, e.g. lower than six, to allow for a low (computational) complexity of the filter. The control circuit may be configured to set at least one of the parameters of the filter(s) to be (proportional to) the first autocorrelation value. The control circuit may be configured to set at least one of the parameters of the filter(s) to be (proportional to) the first additional autocorrelation value. The control circuit may be configured to set at least one of the parameters of the filter(s) to be (proportional to) the second additional autocorrelation value. The control circuit may be configured to set at least one of the parameters of the filter(s) to be (proportional to) the third additional autocorrelation value. At least the first filter, e.g. all of the filters may have four parameters. All of the parameters at least of the first filter, e.g. all of the filters, may be set to be (proportional to) autocorrelation values.

The control circuit 16 may be configured to begin determining at least a first, second and third output energy value only after a number of additional scalar products used for determining the first autocorrelation value Sp(1) exceeds a predetermined threshold (a sufficient number of scalar products from different multiplexing signals was used to determine the first autocorrelation value Sp(1)). The control circuit 16 may be configured to begin determining at least a first, second and third output energy value of the filters only after a sufficient number subframes has passed since starting the determination of the first autocorrelation value Sp(1) (step 104 of flow chart in FIG. 5). The control circuit 16 may be configured to begin determining at least a first, second and third output energy value only after an absolute value |Sp(1)| of the first autocorrelation value Sp(1) (the autocorrelation value for shifting by one, n=1) is above a predetermined threshold Y (step 105 of flow chart in FIG. 5). This may allow for a sufficient noise rejection. The control circuit 16 may be configured to continue receiving and demodulating reference symbols and continuing to refine the autocorrelation values with the new demodulated reference symbols (step 101), if the thresholds have not been reached/breached.

The control circuit 16 may be configured to determine at least a first output energy value $E_{nCP}$ by weighting at least the first autocorrelation value Sp(1) (and the additional autocorrelation values Sp(3), Sp(5), Sp(7)), by (with) a result $W_{nCP}(1)$ (respectively $W_{nCP}(3)$, $W_{nCP}(5)$, $W_{nCP}(7)$) from applying the first filter to the multiplexing signal 20 (e.g. the first multiplexing symbol or any other multiplexing symbol) (step 106 in flow chart of FIG. 5). The control circuit 16 may be configured to determine the first filter output energy value $E_{nCP}$ by weighting all determined autocorrelation values Sp(n) (determined by shifting for the $n^{th}$ degree) by an $n^{th}$ tap of the first filter. $E_{nCP}$ may be defined as follows (exemplarily for the first to seventh autocorrelation value):

$$E_{nCP} = \sum_{n=-7}^{7} W_{nCP}(n)Sp(n) = 2\text{Re}\left\{\sum_{n=0}^{7} W_{nCP}(n)Sp(n)\right\} \quad (5)$$

with $$W_{nCP}(n) = \frac{1}{2\pi}\int_{-\pi}^{\pi} w_{nCP}(\varphi) \cdot e^{j\varphi n} \cdot d\varphi \quad (6)$$

The control circuit 16 may be configured to determine at least a second output energy value $E_{nCP/2}$ by weighting at least the first autocorrelation value Sp(1) (and the additional autocorrelation values Sp(3), Sp(5), Sp(7)), by (with) a result $W_{nCP/2}(1)$ (respectively $W_{nCP/2}(3)$, $W_{nCP/2}(5)$, $W_{nCP/2}(7)$) from applying the second filter to the multiplexing signal 20 (e.g. the first multiplexing symbol or any other multiplexing symbol). The control circuit 16 may be configured to determine the second output energy value $E_{nCP/2}$ by weighting all determined autocorrelation values Sp(n) (determined by shifting for the $n^{th}$ degree) by an $n^{th}$ tap $W_{nCP/2}(n)$ of the second filter. $E_{nCP/2}$ may be defined as follows:

$$E_{nCP/2} = \sum_{n=-7}^{7} W_{nCP/2}(n)Sp(n) = 2\text{Re}\left\{\sum_{n=0}^{7} W_{nCP/2}(n)Sp(n)\right\} \quad (7)$$

with $$W_{nCP/2} = \frac{1}{2\pi}\int_{-\pi}^{\pi} w_{nCP/2}(\varphi) \cdot e^{j\varphi n} \cdot d\varphi \quad (8)$$

The control circuit 16 may be configured to determine at least a second output energy value $E_{nCP/4}$ by weighting at least the first autocorrelation value Sp(1) (and the additional autocorrelation values Sp(3), Sp(5), Sp(7)), by (with) a result $w_{nCP/4}(1)$ (respectively $w_{nCP/4}(3)$, $w_{nCP/4}(5)$, $w_{nCP/4}(7)$) from applying the third filter to the multiplexing signal 20 (e.g. the first multiplexing symbol or any other multiplexing symbol). The control circuit 16 may be configured to determine the third output energy value $E_{nCP/4}$ by weighting all determined autocorrelation values Sp(n) (determined by shifting for the $n^{th}$ degree) by an $n^{th}$ tap $W_{nCP/4}(n)$ of the third filter. $E_{nCP/4}$ may be defined as follows:

$$E_{nCP/4} = \sum_{n=-7}^{7} W_{nCP/4}(n)Sp(n) = 2\text{Re}\left\{\sum_{n=0}^{7} W_{nCP/4}(n)Sp(n)\right\} \quad (9)$$

with $$W_{nCP/4}(n) = \frac{1}{2\pi}\int_{-\pi}^{\pi} w_{nCP/4}(\varphi) \cdot e^{j\varphi n} \cdot d\varphi \quad (10)$$

The control circuit 16 may be configured to determine the first to third output energy values $E_{nCP}$, $E_{nCP/2}$, $E_{nCP/4}$ by weighting a thresholded number of determined autocorrelation values Sp(0), Sp(1), Sp(2), Sp(3), Sp(4), Sp(5), Sp(6), Sp(7), e.g. less than 20, e.g. less than 15, e.g. less than 10, e.g. less than 5. This may result in a low energy consumption, especially since an amount of necessary calculations can be reduced.

The control circuit 16 may be configured to determine the delay spread of the multiplexing signal 20 to be within the first transfer width $T_{nCP}$ when a ratio ($r_m = E_{nCP/2}/E_{nCP}$) of the second output energy value to the first output energy value is below a first predefined threshold (boundary) G1 (see FIG. 4) (step 107 in flow chart of FIG. 5). The first predefined threshold G1 may be a function of at least a ratio ($r_s = E_{nCP/4}/E_{nCP}$) of the third output energy value to the first output energy value. The control circuit 16 may be configured to determine the delay spread of the multiplexing signal 20 to be within the second transfer width $T_{nCP/2}$, when the ratio ($r_m = E_{nCP/2}/E_{nCP}$) of the second output energy value to the first output energy value is above or equal to the first predefined threshold G1 and lower than a second predefined threshold G2. The second predefined threshold G2 may be a function of the ratio ($r_s = E_{nCP/4}/E_{nCP}$) of the third output energy value to the first output energy value. The control circuit 16 may be configured to determine the delay spread of the multiplexing signal 20 to be within the third transfer width $T_{nCP/4}$, when the ratio ($r_m = E_{nCP/2}/E_{nCP}$) of the second output energy value to the first output energy value is above or equal to the second predefined threshold. The control circuit 16 may include a map 18 defining for each combination of ratios rs, rm, which delay spread is to be determined. The map 18 may be divided into at least 2, e.g. at least 3, e.g. at least 4, e.g. at least 5, areas, each area defining a common delay spread estimation to be determined. The map 18 may be a look-up table or may be given indirectly by analytic means.

The control circuit 16 may be configured to apply a "Support Vector Machine" (SVM) method, e.g. applying the "one-against-all" approach. Such a method is described in "Support vector networks" by C. Cortes and V. Vapnik, published in Machine learning, vol. 20, issue 3, pp. 273-297, said document herewith being incorporated by reference.

Figure 4:
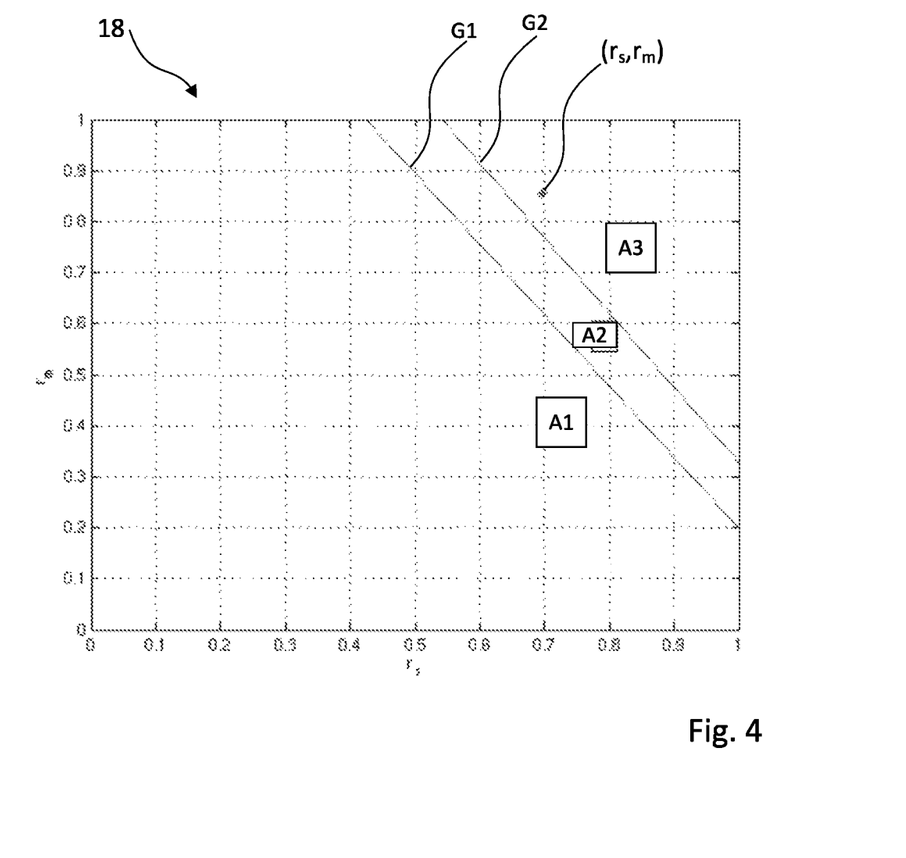
FIG. 4 shows an exemplary classification plane

Using the SVM algorithm, a 2×2 Matrix G and a 2×1 vector v is obtained. The Matrix and the vector describing the thresholds G1 and G2, that are separating the parameter space of the possible ratios $r_m$, $r_s$ into three areas A1, A2, A3. The thresholds G1, G2 may be linear functions. This may simplify necessary calculations and therefor reduce energy consumption. Distances (perpendicular distances) d of a specific ratio pair ($r_s$, $r_m$) to the thresholds G1, G2 can be determined by:

$$d = G \begin{bmatrix} r_s \\ r_m \end{bmatrix} + v \qquad (11)$$

Using the SVM algorithm, the control circuit 16 may be configured to define the first area A1 as the preferred area of the first threshold G1, therefor resulting in a positive entry in d in regard of the first Threshold G1, when the specific ratio pair ($r_s$, $r_m$) is in the first area A1 and resulting in a negative entry if not. When the control circuit 16 determines that the specific ratio pair is in the first area A1, the control circuit 16 may determine that the delay spread is within the first transfer width $T_{nCP}$. Using the SVM algorithm, the control circuit 16 may be configured to define the third area A3 as the preferred area of the second threshold G2, therefor resulting in a positive entry in d in regard of the first Threshold G2, when the specific ratio pair ($r_s$, $r_m$) is in the third area and resulting in a negative entry if not. When the control circuit 16 determines that the specific ratio pair is in the third area A3, the control circuit 16 may determine that the delay spread is within the third transfer width $T_{nCP/4}$. Therefor the control circuit 16 may determine the specific ratio pair to be within the second area A2 and may determine the delay spread to be within the second transfer width $T_{nCP/2}$ when both entries of d are negative.

According to alternative embodiments the thresholds G1, G2 may be non-linear functions.

The control circuit 16 may be configured to set at least one reception parameter, e.g. a filter element, of the receiving circuit in dependence of the determined delay spread.

The control circuit 16 may be configured to determine a channel impulse response (CIR) in dependence of the determined delay spread. The control circuit may be configured to conduct a channel estimation, energy estimation and/or noise estimation in dependence of the determined delay spread.

According to additional embodiments, when the control circuit determines the delay spread to be within the third transfer width, the control circuit may be configured to restart the procedure, herein using the former third filter as new first filter providing new filters having a transfer function with even smaller transfer widths.

The proposed methods may reduce complexity of necessary calculations for determining a delay spread or a channel impulse response of the received multiplexing signal.

The following examples pertain to additional embodiments.

Example 1 is a method for delay spread classification of a multiplexing signal comprising at least a first multiplexing symbol comprising at least two first reference symbols in the frequency domain, the method comprising: receiving at least the first multiplexing symbol; demodulating at least the first reference symbols of the first multiplexing symbol; determining at least a first autocorrelation value by autocorrelating the demodulated first reference symbols in the frequency domain; classifying the delay spread of the multiplexing signal based on at least the first autocorrelation value.

In Example 2, the subject matter of Example 1 can optionally include that classifying the delay spread of the multiplexing signal based on the first autocorrelation value comprises: determining at least a first output energy value by weighting at least the first autocorrelation value by a result from applying a first filter to the multiplexing signal; determining at least a second output energy value by weighting at least the first autocorrelation value by a result of applying a second filter to the multiplexing signal.

In Example 3, the subject matter of Example 2 can optionally include that the first filter has a first transfer function, the first transfer function having a first transfer width and essentially covering a first portion of time and a second portion of time, the first portion of time following the second portion of time and wherein the second filter has a second transfer function, the second transfer function having a second transfer width shorter than the first transfer width and essentially covering the second portion of time, while essentially excluding the first portion of time.

In Example 4, the subject matter of Example 3 can optionally include that classifying the delay spread of the multiplexing signal based on the first autocorrelation value additional comprises: determining the delay spread of the multiplexing signal to be within the first transfer width when a ratio of the second output energy value to the first output energy value is below a first predefined threshold or determining the delay spread to be within the second transfer width, if the ratio of the second output energy value to the first output energy value is above or equal to the first predefined threshold.

In Example 5, the subject matter of any of Examples 1 to 4 can optionally include that determining at least the first autocorrelation value comprises: forming a first vector from the demodulated first reference symbols of the first multiplexing symbol; determining at least one first scalar product from the first vector with a shifted version of the first vector; determining the first autocorrelation value from the first scalar product.

In Example 6, the subject matter of Example 5 can optionally include that determining at least the first autocorrelation value comprises: determining at least one additional autocorrelation value by determining an additional scalar product of the first vector with a shifted versions of the first vector, the degree of shifting being different from the shifting for the first autocorrelation value.

In Example 7, the subject matter of Example 6 can optionally include that the first autocorrelation value is determined by shifting the first vector by 1, a first additional autocorrelation value is determined by shifting the first vector by 3, a second additional autocorrelation value is determined by shifting the first vector by 5, a third additional autocorrelation value is determined by shifting the first vector by 7.

In Example 8, the subject matter of any of Examples 1 to 7 can optionally include that the multiplexing signal comprises at least one additional multiplexing symbol comprising at least two additional reference symbols in the frequency domain, the method further comprising: demodulating at least the additional reference symbols of the additional multiplexing symbol; determining at least the first autocorrelation value from the demodulated first and additional reference symbols in the frequency domain.

In Example 9, the subject matter of Example 8 can optionally include that the first reference symbols of the first multiplexing symbol and the additional reference symbols of the additional multiplexing symbol occupy different resource elements within their respective multiplexing symbol.

In Example 10, the subject matter of Example 8 or 9 can optionally include that the first multiplexing symbol is separated by the additional multiplexing symbol by at least two multiplexing symbols without reference symbols.

In Example 11, the subject matter of any of Examples 8 to 10 can optionally include that the first autocorrelation value comprises: forming a first vector from the demodulated first reference symbols of the first multiplexing symbol; determining at least one first scalar product from the first vector with a version of the first vector shifted by a first degree; forming an additional vector from the demodulated additional reference symbols of the additional multiplexing symbol; determining at least one additional scalar product from the additional vector with a version of the additional vector shifted by the first degree; determining the first autocorrelation value from the first and additional scalar product.

In Example 12, the subject matter of Example 11 can optionally include that determining at least the first autocorrelation value from the first and additional scalar product comprises: determining a first signal to noise ratio of the first scalar product; determining an additional signal to noise ratio of the additional scalar product; determining at least the first autocorrelation value by weighting the first and additional scalar product by their respective signal to noise ratio.

In Example 13, the subject matter of Example 11 or 12 can optionally include that at least the first and second output energy values are determined when an absolute value of the first autocorrelation value is above a predetermined threshold.

In Example 14, the subject matter of any of Examples 11 to 13 can optionally include that at least the first and second output energy values are determined when a number of additional scalar products exceeds a predetermined threshold.

In Example 15, the subject matter of any of any of Examples 4 to 14 can optionally include that the first transfer function is covering a first portion of time, a second portion of time and a third portion of time, the second portion of time following the third portion of time, classifying the delay spread of the multiplexing signal based on the first autocorrelation value further comprising: determining at least a third output energy value by weighting at least the first autocorrelation value by a result from applying a third filter to the multiplexing signal.

In Example 16, the subject matter of Example 15 can optionally include that the third filter has a third transfer function, the third transfer function having a third transfer width shorter than the second transfer width and essentially covering the third portion of time, while essentially excluding the first and second portion of time.

In Example 17, the subject matter of Example 15 or 16 can optionally include that classifying the delay spread of the multiplexing signal based on the first autocorrelation value additionally comprises: determining the delay spread of the multiplexing signal to be within the first transfer width when a ratio of the second output energy value to the first output energy value is below a first predefined threshold.

In Example 18, the subject matter of any of Examples 15 to 17 can optionally include that the first transfer function is covering a first portion of time, a second portion of time and a third portion of time, the second portion of time following the third portion of time, classifying the delay spread of the multiplexing signal based on the first autocorrelation value further comprising: determining the delay spread of the multiplexing signal to be within the second transfer width, if the ratio of the second output energy value to the first output energy value is above or equal to the first predefined threshold and lower than a second predefined threshold.

In Example 19, the subject matter of any of Examples 15-18 can optionally include that the first transfer function is covering a first portion of time, a second portion of time and a third portion of time, the second portion of time following the third portion of time, classifying the delay spread of the multiplexing signal based on the first autocorrelation value further comprising: determining the delay spread of the multiplexing signal to be within the third transfer width, if the ratio of the second output energy value to the first output energy value is above or equal to the second predefined threshold, the first and second predefined thresholds being functions of a ratio of the third output energy value to the first output energy value.

In Example 20, the subject matter of any of Examples 16 to 19 can optionally include that the third transfer width is shorter than or equal to 50% of the second transfer width.

In Example 21, the subject matter of any of Examples 3 to 20 can optionally include that the first transfer width is shorter than about 10% of a length of the first multiplexing symbol.

In Example 22, the subject matter of Example 21 can optionally include that the first transfer width is shorter than or equal to a normal cyclic prefix length of the multiplexing signal.

In Example 23, the subject matter of any of Examples 3 to 22 can optionally include that the second transfer width is shorter than or equal to about 50% of the first transfer width.

In Example 24, the subject matter of any of Examples 1 to 23 can optionally include that at least the first multiplexing symbol comprises at least about 12 reference symbols.

In Example 25, the subject matter of any of Examples 1 to 24 can optionally include that the first reference symbols represent at least about a tenth of the resource elements of the first multiplexing symbol.

In Example 26, the subject matter of Example 25 can optionally include that the first reference symbols represent at least about a sixth of the resource elements of the first multiplexing symbol.

In Example 27, the subject matter of any of Examples 1 to 26 can optionally include that the first reference symbols are evenly distributed within the first multiplexing symbol.

In Example 28, the subject matter of any of Examples 1 to 27 can optionally include that the multiplexing signal is a Long Term Evolution Signal.

In Example 29, the subject matter of any of Examples 1 to 28 can optionally include that the multiplexing signal is a pilot based multiplexing signal.

In Example 30, the subject matter of any of Examples 1 to 29 can optionally include that the multiplexing signal is a frequency-division multiplexing signal.

In Example 31, the subject matter of Example 30 can optionally include that the multiplexing signal is an orthogonal frequency-division multiplexing signal.

Example 32 is a receiving device comprising a receiving circuit and a control circuit, the receiving circuit being configured to receive at least one orthogonal frequency-division multiplexing signal (multiplexing signal) comprising at least a first multiplexing symbol comprising at least two first reference symbols in the frequency domain, the control circuit being configured to: receive at least the first multiplexing symbol from the receiving circuit; demodulate at least the first reference symbols of the first multiplexing symbol; determine at least a first autocorrelation value by autocorrelating the demodulated first reference symbols in the frequency domain; classify the delay spread of the multiplexing signal based on at least the first autocorrelation value.

In Example 33, the subject matter of Example 32 can optionally include that the control circuit is configured to classify the delay spread of the multiplexing signal by: determining at least a first output energy value by weighting at least the first autocorrelation value by a result from applying a first filter to the multiplexing signal, the first filter having a first transfer function, the first transfer function having a first transfer width and essentially covering a first portion of time and a second portion of time, the first portion of time following the second portion of time; determine at least a second output energy value by weighting at least the first autocorrelation value by a result of applying a second filter to the multiplexing signal, the second filter having a second transfer function, the second transfer function having a second transfer width shorter than the first transfer width and essentially covering the second portion of time, while essentially excluding the first portion of time; determining the delay spread of the multiplexing signal to be within the first transfer width when a ratio of the second output energy value to the first output energy value is below a first predefined threshold or determine the delay spread to be within the second transfer width, if the ratio of the second output energy value to the first output energy value is above or equal to the first predefined threshold; setting at least one reception parameter of the receiving circuit in dependence of the determined delay spread.

In Example 34, the subject matter of Example 32 or 33 can optionally include that the control circuit is configured to determine at least the first autocorrelation value by: forming a first vector from the demodulated first reference symbols of the first multiplexing symbol; determining at least one first scalar product from the first vector with a shifted version of the first vector; determining the first autocorrelation value from the first scalar product.

In Example 35, the subject matter of any of Examples 32 to 34 can optionally include that the control circuit is configured to determine at least the first autocorrelation value by: determining at least one additional autocorrelation value by determining an additional scalar product of the first vector with a shifted versions of the first vector, the degree of shifting being different from the shifting for the first autocorrelation value.

In Example 36, the subject matter of any of Examples 32 to 35 can optionally include that the control circuit is configured to: determine the first autocorrelation value by shifting the first vector by 1, determine a first additional autocorrelation value by shifting the first vector by 3, determine a second additional autocorrelation value by shifting the first vector by 5, determine a third additional autocorrelation value by shifting the first vector by 7.

In Example 37, the subject matter of any of Examples 32 to 36 can optionally include that the multiplexing signal comprises at least one additional multiplexing symbol comprising at least two additional reference symbols in the frequency domain, the control circuit being additional configured to: demodulate at least the additional reference symbols of the additional multiplexing symbol; determine at least the first autocorrelation value from the demodulated first and additional reference symbols in the frequency domain.

In Example 38, the subject matter of Example 37 can optionally include that the control circuit is configured to determine at least the first autocorrelation value by: forming a first vector from the demodulated first reference symbols of the first multiplexing symbol; determining at least one first scalar product from the first vector with a version of the first vector shifted by a first degree; forming an additional vector from the demodulated additional reference symbols of the additional multiplexing symbol; determining at least one additional scalar product from the additional vector with a version of the additional vector shifted by the first degree; determining the first autocorrelation value from the first and additional scalar product.

In Example 39, the subject matter of Example 38 can optionally include that the control circuit is configured to determine at least the first autocorrelation value from the first and additional scalar product by: determining a first signal to noise ratio of the first scalar product; determining an additional signal to noise ratio of the additional scalar product; determining at least the first autocorrelation value by weighting the first and additional scalar product by their respective signal to noise ratio.

In Example 40, the subject matter of Example 39 can optionally include that the control circuit is configured to determine at least the first and second output energy values when an absolute value of the first autocorrelation value is above a predetermined threshold.

In Example 41, the subject matter of any of Examples 33 to 40 can optionally include that the first transfer function is covering a first portion of time, a second portion of time and a third portion of time, the second portion of time following the third portion of time, and wherein the control circuit is configured to determine the delay spread by: determining at least a third output energy value by weighting at least the first autocorrelation value by a result from applying a third filter to the multiplexing signal, the third filter having a third transfer function, the third transfer function having a third transfer width shorter than the second transfer width and essentially covering the third portion of time, while essentially excluding the first and second portion of time; determining the delay spread of the multiplexing signal to be within the first transfer width when a ratio of the second output energy value to the first output energy value is below a first predefined threshold, determining the delay spread of the multiplexing signal to be within the second transfer width, if the ratio of the second output energy value to the first output energy value is above or equal to the first predefined threshold and lower than a second predefined threshold, determining the delay spread of the multiplexing signal to be within the third transfer width, if the ratio of the second output energy value to the first output energy value is above or equal to the second predefined threshold, the first and second predefined thresholds being functions of a ratio of the third output energy value to the first output energy value.

Example 42 is a telecommunication device comprising a receiving circuit and a control circuit, the receiving circuit being configured to receive at least one orthogonal frequency-division multiplexing signal (multiplexing signal) comprising at least a first multiplexing symbol comprising at least two first reference symbols in the frequency domain, the control circuit being configured to: receive at least the first multiplexing symbol from the receiving circuit;

demodulate at least the first reference symbols of the first multiplexing symbol; determine at least a first autocorrelation value by autocorrelating the demodulated first reference symbols in the frequency domain; classify the delay spread of the multiplexing signal based on at least the first autocorrelation value.

In Example 43, the subject matter of Example 42 can optionally include that the control circuit is configured to classify the delay spread of the multiplexing signal by: determine at least a first output energy value by weighting at least the first autocorrelation value by a result from applying a first filter to the multiplexing signal, the first filter having a first transfer function, the first transfer function having a first transfer width and essentially covering a first portion of time and a second portion of time, the first portion of time following the second portion of time; determine at least a second output energy value by weighting at least the first autocorrelation value by a result of applying a second filter to the multiplexing signal, the second filter having a second transfer function, the second transfer function having a second transfer width shorter than the first transfer width and essentially covering the second portion of time, while essentially excluding the first portion of time; determine the delay spread of the multiplexing signal to be within the first transfer width when a ratio of the second output energy value to the first output energy value is below a first predefined threshold or determine the delay spread to be within the second transfer width, if the ratio of the second output energy value to the first output energy value is above or equal to the first predefined threshold; setting at least one reception parameter of the receiving circuit in dependence of the determined delay spread.

In Example 44, the subject matter of Example 42 or 43 can optionally include that the control circuit is configured to determine at least the first autocorrelation value by: forming a first vector from the demodulated first reference symbols of the first multiplexing symbol; determining at least one first scalar product from the first vector with a shifted version of the first vector; determining the first autocorrelation value from the first scalar product.

In Example 45, the subject matter of Example 44 can optionally include that the control circuit is configured to determine at least the first autocorrelation value by: determining at least one additional autocorrelation value by determining an additional scalar product of the first vector with a shifted versions of the first vector, the degree of shifting being different from the shifting for the first autocorrelation value.

In Example 46, the subject matter of Example 45 can optionally include that the control circuit is configured to: determine the first autocorrelation value by shifting the first vector by 1, determine a first additional autocorrelation value by shifting the first vector by 3, determine a second additional autocorrelation value by shifting the first vector by 5, determine a third additional autocorrelation value by shifting the first vector by 7.

In Example 47, the subject matter of any of Examples 42 to 46 can optionally include that the multiplexing signal comprises at least one additional multiplexing symbol comprising at least two additional reference symbols in the frequency domain, the control circuit being additional configured to: demodulate at least the additional reference symbols of the additional multiplexing symbol; determine at least the first autocorrelation value from the demodulated first and additional reference symbols in the frequency domain.

In Example 48, the subject matter of Example 47 can optionally include that the control circuit is configured to determine at least the first autocorrelation value by: forming a first vector from the demodulated first reference symbols of the first multiplexing symbol; determining at least one first scalar product from the first vector with a version of the first vector shifted by a first degree; forming an additional vector from the demodulated additional reference symbols of the additional multiplexing symbol; determining at least one additional scalar product from the additional vector with a version of the additional vector shifted by the first degree; determining the first autocorrelation value from the first and additional scalar product.

In Example 49, the subject matter of Example 48 can optionally include that the control circuit is configured to determine at least the first autocorrelation value from the first and additional scalar product by: determining a first signal to noise ratio of the first scalar product; determining an additional signal to noise ratio of the additional scalar product; determining at least the first autocorrelation value by weighting the first and additional scalar product by their respective signal to noise ratio.

In Example 50, the subject matter of Example 49 can optionally include that the control circuit is configured to determine at least the first and second output energy values when an absolute value of the first autocorrelation value is above a predetermined threshold.

In Example 51, the subject matter of any of Examples 43 to 50 can optionally include that the first transfer function is covering a first portion of time, a second portion of time and a third portion of time, the second portion of time following the third portion of time, and wherein the control circuit is configured to determine the delay spread by: determining at least a third output energy value by weighting at least the first autocorrelation value by a result from applying a first filter to the multiplexing signal, the third filter having a third transfer function, the third transfer function having a third transfer width shorter than the second transfer width and essentially covering the third portion of time, while essentially excluding the first and second portion of time; determining the delay spread of the multiplexing signal to be within the first transfer width when a ratio of the second output energy value to the first output energy value is below a first predefined threshold, determining the delay spread of the multiplexing signal to be within the second transfer width, if the ratio of the second output energy value to the first output energy value is above or equal to the first predefined threshold and lower than a second predefined threshold, determining the delay spread of the multiplexing signal to be within the third transfer width, if the ratio of the second output energy value to the first output energy value is above or equal to the second predefined threshold, the first and second predefined thresholds being functions of a ratio of the third output energy value to the first output energy value.

The invention claimed is:
1. A method for delay spread classification of a multiplexing signal comprising a first multiplexing symbol including two first reference symbols in the frequency domain, the method comprising:
    receiving the first multiplexing symbol;
    demodulating the first two reference symbols of the first multiplexing symbol;
    determining a first autocorrelation value by autocorrelating the demodulated first two reference symbols in the frequency domain;

filtering the multiplexing signal using a set of filters to provide a set of respective energy output values,
  wherein one or more parameters associated with the set of filters are calculated based upon the first autocorrelation value, and
  wherein each filter from among the set of filters has a respective transfer width in terms of a different time length, each of the different time lengths being proportional to a length of time associated with the multiplexing signal; and
determining a delay spread of the multiplexing signal as being within a transfer width associated with one of the filters from among the set of filters based on one or more energy output ratios exceeding one or more energy thresholds, the one or more energy output ratios being associated with ratios between one or more energy output values from among the set of respective energy output values.

2. The method of claim 1, wherein determining the delay spread of the multiplexing signal comprises:
  determining a first output energy value from among the set of respective energy output values by weighting the first autocorrelation value with a result of applying a first filter from among the set of filters to the multiplexing signal; and
  determining a second output energy value from among the set of respective energy output values by weighting the first autocorrelation value with a result of applying a second filter from among the set of filters to the multiplexing signal.

3. The method of claim 2, wherein the first filter has a first transfer function, the first transfer function having a first transfer width substantially covering a first portion of time and a second portion of time, the first portion of time chronologically following the second portion of time, and
  wherein the second filter has a second transfer function, the second transfer function having a second transfer width shorter than the first transfer width and substantially covering the second portion of time while substantially excluding the first portion of time.

4. The method of claim 3, wherein determining the delay spread of the multiplexing signal further comprises:
  determining the delay spread of the multiplexing signal to be within the first transfer width when a ratio of the second output energy value to the first output energy value is below a first predefined threshold from among the one or more energy thresholds; and
  determining the delay spread to be within the second transfer width when the ratio of the second output energy value to the first output energy value is above or equal to the first predefined threshold.

5. The method of claim 1, wherein determining the first autocorrelation value comprises:
  forming a first vector from the demodulated two first reference symbols of the first multiplexing symbol;
  determining a first scalar product from the first vector with a shifted version of the first vector; and
  determining the first autocorrelation value from the first scalar product.

6. The method of claim 5, wherein determining the first autocorrelation value comprises:
  determining an additional autocorrelation value by determining a second scalar product of the first vector with a shifted versions of the first vector, the degree of shifting being different from the shifting for the first autocorrelation value.

7. The method of claim 1, wherein the multiplexing signal comprises an additional multiplexing symbol including two additional reference symbols in the frequency domain, the method further comprising:
  demodulating the two additional reference symbols; and
  determining the first autocorrelation value from the demodulated two first reference symbols and the two additional reference symbols in the frequency domain.

8. The method of claim 7, wherein determining the first autocorrelation value comprises:
  forming a first vector from the demodulated two first reference symbols of the first multiplexing symbol;
  determining a first scalar product from the first vector with a version of the first vector shifted by a first degree;
  forming an additional vector from the demodulated additional two reference symbols of the additional multiplexing symbol;
  determining a second additional scalar product from the additional vector with a version of the additional vector shifted by the first degree; and
  determining the first autocorrelation value from the first and the second scalar product.

9. The method of claim 8, wherein determining the first autocorrelation value from the first and the second scalar product comprises:
  determining a first signal to noise ratio of the first scalar product;
  determining a second signal to noise ratio of the second scalar product;
  determining the first autocorrelation value by weighting the first and the second scalar product by their respective signal to noise ratio.

10. The method of claim 4, wherein the first transfer function covers a first portion of time, a second portion of time and a third portion of time, the second portion of time chronologically following the third portion of time,
  wherein determining the delay spread of the multiplexing signal further comprises:
  determining a third output energy value from among the set of respective energy output values by weighting the first autocorrelation value with a result of applying a third filter from among the set of filters to the multiplexing signal.

11. The method of claim 10, wherein the third filter has a third transfer function, the third transfer function having a third transfer width shorter than the second transfer width and substantially covering the third portion of time while substantially excluding the first and second portion of time.

12. The method of claim 10, wherein determining the delay spread of the multiplexing signal further comprises:
  determining the delay spread of the multiplexing signal to be within the first transfer width when a ratio of the second output energy value to the first output energy value is below a first predefined threshold from among the one or more energy thresholds.

13. The method of claim 10, wherein determining the delay spread of the multiplexing signal further comprises:
  determining the delay spread of the multiplexing signal to be within the second transfer width when the ratio of the second output energy value to the first output energy value is above or equal to the first predefined threshold and lower than a second predefined threshold from among the one or more energy thresholds.

14. The method of claim 11, wherein determining the delay spread of the multiplexing signal further comprises:
determining the delay spread of the multiplexing signal to be within the second transfer width when the ratio of the second output energy value to the first output energy value is above or equal to the first predefined threshold and lower than a second predefined threshold from among the one or more energy thresholds; and
determining the delay spread of the multiplexing signal to be within the third transfer width when the ratio of the second output energy value to the first output energy value is above or equal to the second predefined threshold, the first and second predefined thresholds being functions of a ratio of the third output energy value to the first output energy value.

15. The method of claim 11, wherein the third transfer width is shorter than or equal to 50% of the second transfer width.

16. The method of claim 3, wherein the first transfer width is shorter than 10% of a length of the first multiplexing symbol.

17. The method of claim 16, wherein the first transfer width is shorter than or equal to a cyclic prefix length associated with the multiplexing signal.

18. The method of claim 3, wherein the second transfer width is shorter than or equal to 50% of the first transfer width.

19. The method of claim 1, wherein the first multiplexing symbol comprises reference symbols.

20. The method of claim 1, wherein the two first reference symbols are from among a set of first reference symbols that are evenly distributed in the frequency domain within the first multiplexing symbol.

21. The method of claim 1, wherein the multiplexing signal is a Long Term Evolution (LTE) signal.

22. The method of claim 1, wherein the multiplexing signal is a pilot-based multiplexing signal.

23. The method of claim 1, wherein the multiplexing signal is an orthogonal frequency-division multiplexing signal.

24. A receiving device, comprising:
a receiving circuit configured to receive an orthogonal frequency-division multiplexing signal including a first multiplexing symbol comprising two first reference symbols in the frequency domain; and
a control circuit configured to:
receive the first multiplexing symbol from the receiving circuit;
demodulate the first reference symbols of the first multiplexing symbol;
determine a first autocorrelation value by autocorrelating the demodulated first reference symbols in the frequency domain;
filter the orthogonal frequency-division multiplexing signal using a set of filters to provide a set of respective energy output values, the one or more parameters associated with the set of filters being calculated based upon the first autocorrelation value,
wherein each filter from among the set of filters has a respective transfer width in terms of a different time length, each of the different time lengths being proportional to a length of time associated with the multiplexing signal; and
determine the delay spread of the multiplexing signal as being within a transfer width associated with one of the filters from among the set of filters based on one or more energy output ratios exceeding one or more energy thresholds, the one or more energy output ratios being associated with ratios between one or more energy output values from among the set of respective energy output values.

25. The receiving device of claim 24, wherein a first filter from among the set of filters has a first transfer function, the first transfer function having a first transfer width substantially covering a first portion of time and a second portion of time, the first portion of time chronologically following the second portion of time, and wherein a second filter from among the set of filters has a second transfer function, the second transfer function having a second transfer width shorter than the first transfer width and substantially covering the second portion of time while substantially excluding the first portion of time, and wherein the control circuit is further configured to:
determine a first output energy value from among the set of respective energy output values by weighting the first autocorrelation value with a result of applying the first filter to the multiplexing signal; and
determine a second output energy value from among the set of respective energy output values by weighting the first autocorrelation value with a result of applying the second filter to the multiplexing signal;
determine the delay spread of the multiplexing signal to be within the second transfer width when the ratio of the second output energy value to the first output energy value is above or equal to a first predefined threshold from among the one or more energy thresholds and lower than a second predefined threshold from among the one or more energy thresholds; and
determining the delay spread of the multiplexing signal to be within the third transfer width when the ratio of the second output energy value to the first output energy value is above or equal to the second predefined threshold, the first and second predefined thresholds being functions of a ratio of a third output energy value from among the one or more energy thresholds to the first output energy value.

\* \* \* \* \*